United States Patent [19]

McKee, Jr.

[11] 3,941,586

[45] Mar. 2, 1976

[54] METHOD AND APPARATUS FOR REGENERATING COLD TRAPS WITHIN LIQUID-METAL SYSTEMS

[75] Inventor: John M. McKee, Jr., Hinsdale, Ill.

[73] Assignee: The United States of America as represented by the United States Energy Research and Development Administration, Washington, D.C.

[22] Filed: May 29, 1975

[21] Appl. No.: 581,612

[52] U.S. Cl. .................. 75/66; 55/387; 176/37; 210/85; 423/461
[51] Int. Cl.² ........................... C22B 27/00
[58] Field of Search ............ 75/66; 176/37; 55/387; 210/85, 185; 62/55.5; 423/192, 200, 461

[56] References Cited
UNITED STATES PATENTS

| | | |
|---|---|---|
| 3,618,770 | 11/1971 | Pohl ............................ 176/37 UX |
| 3,622,303 | 11/1971 | Hill ................................. 75/66 |
| 3,831,912 | 8/1974 | Shimoyashiki et al. ................. 75/66 |
| 3,854,933 | 12/1974 | Furukawa ............................. 75/66 |

*Primary Examiner*—M. J. Andrews
*Attorney, Agent, or Firm*—Dean E. Carlson; Arthur A. Churm; Hugh Glenn

[57] ABSTRACT

Oxide and hydride impurities of a liquid metal such as sodium are removed from a cold trap by heating to a temperature at which the metal hydroxide is stable in a molten state. The partial pressure of hydrogen within the system is measured to determine if excess hydride or oxide is present. Excess hydride is removed by venting hydrogen gas while excess oxide can be converted to molten hydroxide through the addition of hydrogen. The resulting, molten hydroxide is drained from the trap which is then returned to service at cold trap temperatures within the liquid-metal system.

12 Claims, 2 Drawing Figures

METHOD AND APPARATUS FOR REGENERATING COLD TRAPS WITHIN LIQUID-METAL SYSTEMS

CONTRACTUAL ORIGIN OF THE INVENTION

The invention described herein was made in the course of, or under, a contract with the UNITED STATES ENERGY RESEARCH AND DEVELOPMENT ADMINISTRATION.

BACKGROUND OF THE INVENTION

This invention relates to cold traps that are employed within the flow of a liquid metal for the precipitation and removal of impurities. It is particularly applicable in sodium or sodium potassium systems used for the transfer of heat in nuclear or other power production facilities.

Oxide and hydride impurities can accumulate within a sodium-liquid-metal system from a number of sources. Small leaks of air or steam may occasionally occur and impurities may be present within the system construction materials. One major source of hydride impurities occurs from the diffusion of hydrogen through heat exchanger walls in liquid metal/steam or water heat exchangers. Heat exchangers of this type are ordinarily used as steam generators in the liquid-metal-cooled nuclear reactors. The oxidation of iron or other metals within the heat exchanger walls by $H_2O$ releases hydrogen for diffusion through the barrier into the molten sodium.

Cold traps are most often included within a bypass or shunt loop of a liquid metal circulation system. The loop will normally include a heat exchanger called an economizer through which the diverted liquid metal flows on leaving and on reentering the main liquid-metal flow. The diverted liquid metal is cooled to some lower temperature at which the dissolved hydrides and oxides become supersaturated and precipitate as solid deposits. The deposition has normally occurred within a large crystallizer tank containing baffles and packing to facilitate the precipitation process. The returning liquid metal is reheated as it passes through the economizer in heat exchange relationship with the diverted liquid-metal flow.

The buildup of solid impurities within the cold trap crystallizer tank will eventually slow the flow of diverted liquid metal until the cold trap system is no longer effective. Heretofore, this problem was overcome by removing and replacing the crystallizer tank. A number of these tanks have been removed from various experimental liquid-metal cooled systems. Examination of a selected number of these crystallizer tanks has revealed that only approximately 10 percent of each tank's volume was filled with solid impurities. The remaining volume not occupied by baffles or packing was filled with sodium or liquid metal. The disposal of these tanks therefore results in considerable waste of materials and considerable maintenance expense in their removal and replacement.

Crystallizer tanks are presently sized to have at least a five-year life prior to their replacement. However, unforeseen air or steam leaks into the sodium flow could require earlier replacement. In primary coolant circuits that are in heat exchange relationship with a nuclear reactor core, such replacement may also become desirable to reduce the inventory of tritium and other radioisotopes deposited within the crystallizer tank.

SUMMARY OF THE INVENTION

Therefore, in view of these and other problems associated with prior liquid-metal cold traps, it is an object of the present invention to provide a method of unloading impurities from cold traps without physical removal of cold trap components.

It is a further object to provide a method of determining whether excess hydride or oxide impurities are present and to remove these impurities from the cold trap.

It is also an object to provide an improved cold trap apparatus that will permit the unloading of impurities while the cold trap remains installed as a part of the liquid-metal system.

In accordance with the present invention, metal hydride and oxide impurities are removed from a liquid-metal system including a cold trap where solid impurities deposit by heating the trap to a sufficient temperature to form molten metal hydroxide from the reaction of the metal hydride and the metal oxide. The molten hydroxide is drained from the system and the partial pressure of hydrogen gas measured to determine whether excess metal hydride or metal oxide is present. In order to remove excess sodium hydride or excess sodium oxide, the partial pressure of hydrogen gas within the cold trap volume is adjusted either by venting or by addition of hydrogen to provide a hydrogen gas pressure between the hydrogen dissociation pressure of sodium hydride and the hydrogen dissociation pressure of sodium hydroxide at the elevated cold trap temperature.

The invention also contemplates an improved cold trap apparatus for removing impurities from a liquid-metal system. The cold trap includes a first tank having an inlet and outlet that are interconnected with the liquid-metal system for permitting a flow of liquid metal through the tank. There are also included means for varying the temperature of the tank and the materials within the tank from temperatures at which the impurities are solid to temperatures at which the impurities form a melt. In the case of sodium hydride and sodium oxide impurities, these temperatures will range from somewhere below 200°C. e.g. down to 100°C. for reduction of solubility of oxides and hydrides in molten sodium to a temperature above 412°C. e.g. up to 550°C. at which sodium hydride and sodium oxide will react to form molten sodium hydroxide. A second tank is interconnected with the first tank and receives the melt as thus formed of impurities. The improved cold trap also includes monitoring means for determining the existence of residual impurities such as excess sodium hydride or sodium oxide after draining the melt.

DESCRIPTION OF THE DRAWINGS

The present invention is illustrated in the accompanying drawings wherein.

DETAILED DESCRIPTION OF THE PREFERRED EMBODIMENT

Figure 1:
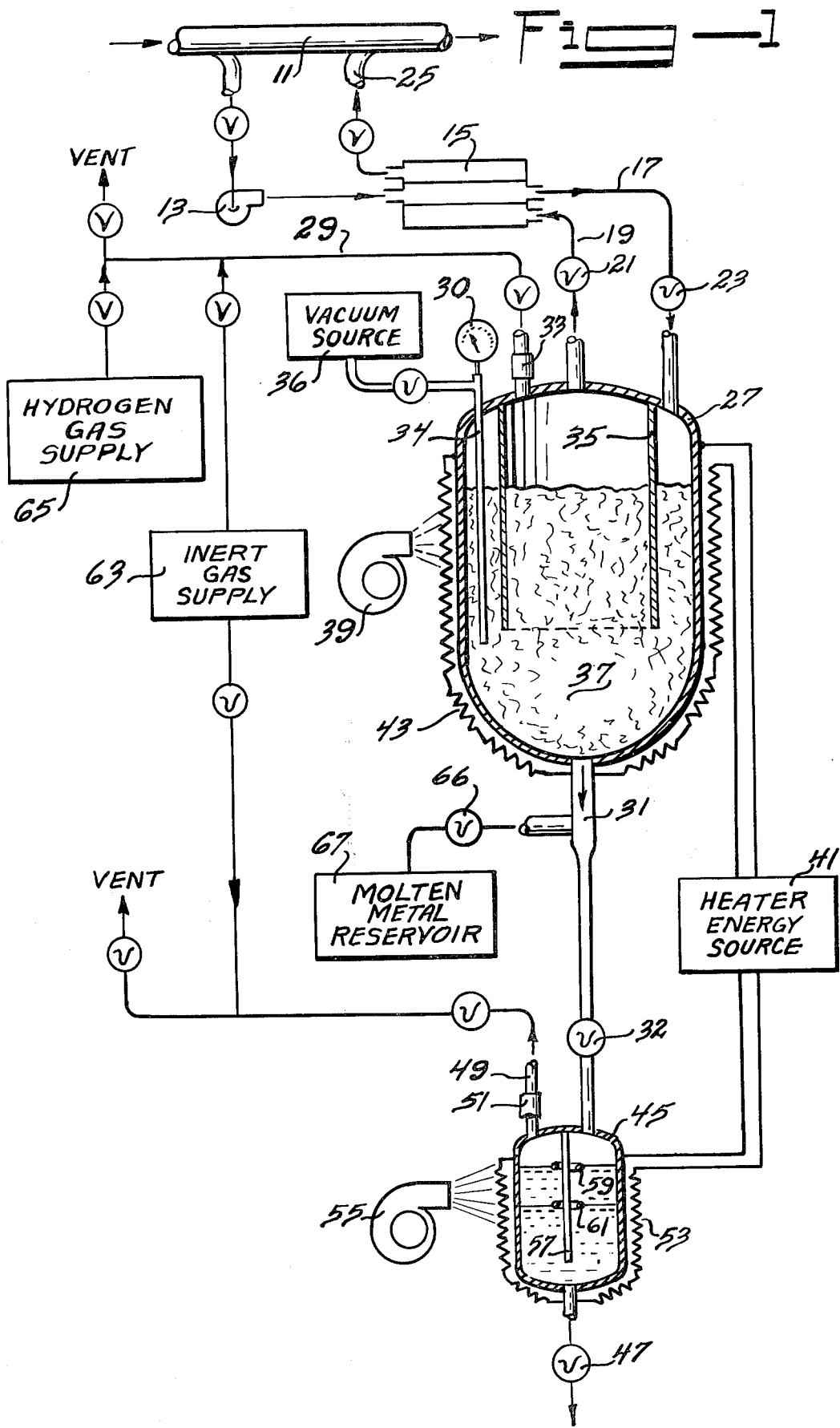
FIG. 1 is a generally schematic view of a cold trap for removing impurities from a liquid-metal system.

In FIG. 1 a generally schematic view of a cold trap apparatus is shown. Liquid metal for processing within the cold trap is withdrawn from a liquid metal system illustrated as the fragmentary pipe shown at 11. This liquid-metal system will ordinarily be one that employs molten sodium or a molten sodium metal alloy for the transfer of heat. As an example, system 11 could be the primary heat transfer loop that removes heat from a liquid-metal-cooled nuclear reactor core or the secondary heat transfer loop that provides heat from the first loop to a steam generator.

A portion of the flow of liquid metal within system 11 is withdrawn such as through a pump 13 and caused to flow through a heat exchanger 15 that is often termed an economizer. Economizer 15 merely recovers a portion of the heat that would otherwise be lost as a result of the required cooling within the cold trap apparatus. The flow of liquid metal leaves economizer 15 through pipe 17 at a somewhat reduced temperature than that of the liquid metal within the system 11. The cooling is provided by the return flow of liquid metal which leaves the cold trap apparatus through pipe 19 and passes through the economizer 15 in the opposite direction. Valves 21 and 23 are provided to isolate the remainder of the cold trap apparatus from the economizer 15 and the liquid-metal system 11. The return flow of liquid metal leaving the economizer 15 returns to the liquid-metal system 11 through pipe 25.

A pressure vessel or tank 27, referred to as a crystallizer tank, is interconnected with pipes 17 and 19 to permit flow of the liquid metal through its inner volume. Tank 27 includes an outer wall that completely encloses its inner volume except for a number of inlets and outlets such as those for pipes 17 and 19 along with a vent outlet 29 and a drain outlet 31. Vent outlet 29 also serves as an inlet for gas flow as will be described below. Outlet 29 is also illustrated with a vapor trap 33 such as a tube containing suitable packing for demisting and condensing sodium vapor. The condensed liquid metal gravitates back into tank 27.

Tank 27 is provided with a hollow cylindrical baffle 35 depending coaxially within the tank inner volume. Baffle 35 sealingly engages the top of the tank 27 and is disposed to separate the inlet at pipe 17 from the outlet at pipe 19 to direct the flow of liquid metal through two longitudinal passes through tank 27.

A major portion of the inner volume within tank 27 is filled with a metallic packing material 37. Packing 37 can be random wire mesh, fibers, wires, rings or other conventional packing material such as Raschig rings or saddles. Packing material 37, as well as baffle 35 and tank 27 and other exposed portions of the cold trap apparatus are made of a metal or metal alloy that is resistant to molten sodium hydroxide, for instance, nickel or high nickel alloys would be suitable.

A blower 39 or other suitable means is provided for cooling tank 27 and its contents to a temperature at which oxide and hydride impurities crystallize onto the packing material 37. Ordinarily a crystallizer tank for a sodium-liquid-metal system would be operated at a temperature of 100°–200°C.

Crystallizer tank 27 is also provided with means for heating its contents to a substantially higher temperature than that used for precipitating impurities. For sodium-liquid-metal systems with oxide and hydride impurities these temperatures will be in the range of 412°–550°C. The heating means will include a suitable energy source 41 and heat transfer component 43 in heat exchange relationship with tank 27. For instance, a conventional electrical resistance or inductance heating system will be suitable for this purpose.

Tank 27 includes means for monitoring the hydrogen partial pressure within its inner volume. This is illustrated by an absolute pressure gauge 30 adapted to read pressures above and below atmospheric pressure. The pressure gauge is interconnected with an elongated and sealed tube 34 of a material that selectively permits hydrogen permeation, for instance, of nickel metal. The sealed tube includes a valve outlet connected to a vacuum source 36 to provide initial evacuation of gases other than hydrogen.

Drain outlet 31 within the lower portion of tank 27 is interconnected through a valve 32 to a smaller, closed tank 45. Tank 45 includes its inlet connected with outlet 31, a valved drain outlet 47 and a vent outlet 49 complete with a sodium vapor trap 51. Suitable means are also provided for heating and cooling tank 45 such as electrical resistance component 53 and blower 55.

A liquid-level indicator 57 is illustrated installed within tank 45. Various commercially available level indication type devices can be used. For instance, one having internal floats whose position can be determined through their effect on external electrical circuitry. Level indicator 57 is illustrated with two floats 59 and 61 which can be used in a sodium-liquid metal system for determining if an upper level of molten sodium metal is present on a more dense level of molten sodium hydroxide. The density of molten sodium hydroxide is about twice that of molten sodium metal.

An inert gas supply 63, a hydrogen gas supply 65 and a molten metal reservoir 67 are illustrated diagrammatically in communication with tanks 27 and 45 of the cold trap apparatus. The interrelationship of these components with the remainder of the cold trap apparatus is described hereinbelow with respect to the method of operation.

In the ordinary manner of operating a cold trap apparatus, liquid metal is withdrawn from a low temperature portion of the liquid-metal system 11. For instance, in a secondary heat transfer loop associated with a liquid-metal cooled reactor the withdrawal would be made downstream of the steam generator where the liquid metal would have a temperature in the neighborhood of 300°C.

The liquid metal is cooled as it passes through economizer 15 and then enters the outer peripheral volume of tank 27 through line 17. Although not shown the entire inner volume of tank 27 is filled with the liquid metal as it flows downwardly outside baffle 35 through packing 37 and upwardly within the inner volume of baffle 35 to outlet line 19. Where sodium liquid metal is used, the temperature of the liquid metal is further cooled with blower 39 to a temperature of about 100°–200°C. At these temperatures the solubility of sodium oxide and sodium hydride in liquid sodium are reduced below the concentration of these impurities within liquid sodium at the system operating temperatures. Consequently, these hydride and oxide impurities will crystallize within the flowing sodium metal and deposit on or be filtered out by the packing material 37.

After a substantial period of operation, the lower portion of tank 27 will become partially or fully clogged with the solidified impurities such that the flow of liquid metal through the crystallizer tank 27 will be substantially reduced. When this occurred in previous cold trap operations, the crystallizer tank 27 was removed from the system and discarded along with the packing and sodium metal. A new and clean tank would then be installed. In order to avoid frequent resort to this wasteful operation, large volume tanks were employed as crystallizer tanks.

With the improved cold trap apparatus and method of the present invention, the crystallizer tank 27 remains installed for the entire life of the heat transfer system. When the flow of liquid metal through the crystallizer tank becomes substantially impeded by the accumulation of solid impurities, the crystallizer tank 27 is unloaded in accordance with the method of the invention. Consequently, a smaller tank can be selected than would previously have been selected for a similar operation. Merely by way of example a liquid-metal-cooled reactor rated at 300 megawatt might now be served by a 1000 liter crystallizer tank while previously a 3000 liter tank would have been required.

In unloading the crystallizer tank 27, outlet valve 21 is closed and a small volume of inert gas is added through vent outlet 29 to act as a cushion within the tank. Valve 23 is closed to isolate the crystallizer tank from the liquid metal system. The liquid metal is then drained through drain outlet 31 into the molten metal reservoir 67. Most liquid metal heat transfer systems include a drain tank which can serve as reservoir 67. This operation can be facilitated by stopping the blower cooler 39, heating the drain line 31 and adding an inert gas such as argon through vent outlet 29 to displace the liquid metal. If crystallized impurities have blocked drain line 31, a small reverse flow of liquid metal from reservoir 67 can remove the blockage.

After draining the sodium from the crystallizer tank, valve 66 to reservoir 67 is closed and valve 32 to the small waste tank 45 is opened. The material within crystallizer tank 27 is heated to a temperature in excess of 412°C. to bring about the following reaction.

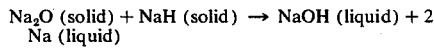

Na$_2$O (solid) + NaH (solid) → NaOH (liquid) + 2 Na (liquid)

Within the sodium-oxygen-hydrogen system at large concentrations of hydrogen and oxygen, 412°C. represents a temperature about which the above reaction at eqilibrium favors sodium hydroxide and sodium metal. (See ANL-7868, "Sodium Technology Quarterly Report", July-September 1971, Argonne National Laboratory, March 1972, pages 44–45.) After heating the sodium hydride and sodium oxide within crystallizer tank 27 to a temperature of about 450°C. which is sufficiently above 412°C. to urge strong reaction to sodium hydroxide and sodium but yet not so high as to cause severe material stress and corrosion, the sodium hydroxide as thus produced will drain into the waste tank 45 which is heated to the same temperature as tank 27. Level indicator 57 can be monitored to determine when the reaction is complete. Laboratory tests illustrated in the Examples given below indicate that the reaction will be substantially complete after about 24 hours.

The hydrogen partial pressure within crystallizer tank 27 is then monitored to determine if excess sodium hydride or sodium oxide remains. This is accomplished by evacuating nickel tube 34 to a subatmospheric pressure with vacuum source 36 and allowing hydrogen gas to diffuse to equilibrium in communication with hydrogen pressure gauge 30. After closing the valve to the vacuum source, hydrogen equilibrium pressure will ordinarily be obtained in about one-half hour within a tube of about 1 cm diameter by about 1 mm wall thickness. If the hydrogen pressure is substantially in excess of the equilibrium hydrogen pressure over sodium hydroxide at the system temperature and approaches the equilibrium hydrogen pressure over sodium hydride at that temperature then significant excess sodium hydride is most likely present. If, on the other hand, the hydrogen pressure is very near the equilibrium hydrogen pressure over sodium hydroxide, then it is likely that excess sodium oxide is present. As an example at 450°C. a pressure of 200–250 Torr (all pressures are given as absolute pressure) would indicate excess sodium oxide while a pressure in excess of 600 Torr would suggest excess sodium hydride.

Figure 2:
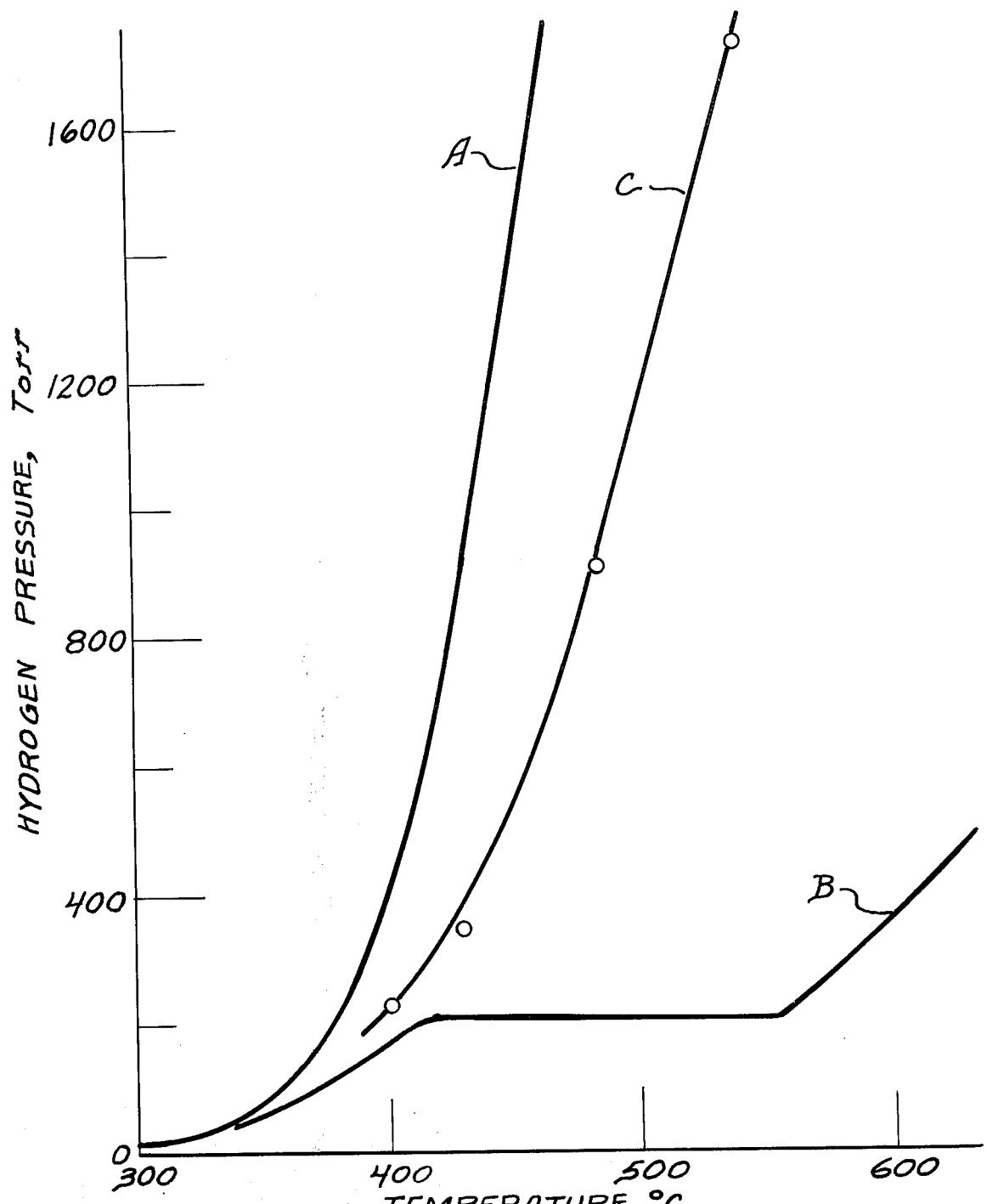
FIG. 2 is a graph of hydrogen partial pressure versus temperature for several sources of hydrogen that involve the dissociation of metallic compounds containing hydrogen.

In order to better illustrate these pressure temperature relationships, FIG. 2 is presented showing in curve A the equilibrium hydrogen pressure over sodium hydride obtained from an equation given for this relationship in Herold, Compt. Rend. 228, 686 (1949) and Banus et al., J. Am. Chem. Soc. 77, 2007 (1955). Curve B similarly shows hydrogen pressure over sodium hydroxide and 37 mole percent sodium metal taken from Mitkevich and Shikev, Russian J. Inorg. Chem. 11, 343 (1966). Curve C is also presented and will be identified below in connection with Example I.

Where excess sodium hydride is present, it is removed by venting the hydrogen vapor through outlet 29 until the hydrogen pressure within tank 27 drops to some suitable value well below the hydrogen equilibrium pressure over sodium hydride, for instance, to 1 atmosphere pressure at 450°C. At these temperatures nearly all of the sodium hydride will dissociate into hydrogen gas and sodium metal. Where excess sodium oxide is present, additional hydrogen gas can be added to the system through vent outlet 29 from the hydrogen gas supply 65. At temperatures of 412°–550°C., the hydrogen gas will react with sodium oxide to form molten sodium hydroxide which will then drain into waste tank 45. This step can be continued until the level in tank 45 stabilizes and a hydrogen pressure in excess of about 200–250 Torr e.g. about 400 Torr can be maintained within crystallizer tank 27.

One other method of providing hydride for reaction with excess sodium oxide is to return the crystallizer tank into operation within the liquid-metal system 11. This will be successful if excess sodium hydride is generated within the liquid-metal system. This may well be the case in liquid-metal heat transfer systems having interface with steam generators in which hydrogen gas produced by oxidation of the steam generator materials diffuses into the liquid metal flow. In other instances, such as in primary coolant loops within nuclear reactors, it may be desirable to introduce hydrogen gas into the liquid-metal flow to sweep out tritium or other radioisotopes from the heat transfer loop. This intentional introduction of hydrogen, of course, will cause sodium hydride to crystallize within the cold trap.

After the impurities have been drained as sodium hydroxide into waste tank 45, heating is discontinued and the waste tank cooled such as with blower 55. The waste tank is cooled to a reduced temperature that is still above the 318°C. melting point of sodium hydroxide, for instance to about 350°C. and the molten sodium hydroxide drained into a disposable container through outlet 47. If desired, the sodium hydroxide and sodium layers can be drained into separate containers.

The complete unloading operation is expected to last no more than 2 or 3 days. During this interval most liquid metal systems will function quite well without a cold trap. To return the cold trap to operation within the liquid metal system, crystallizer tank 27 is valved off from the waste tank 45 and the flow of liquid metal reestablished through the economizer and the crystallizer tank.

In order to illustrate the operability of the described cold trap apparatus and method the following examples are presented.

EXAMPLE I

Equal molar amounts (approximately ¾ gram mole each) of granular $Na_2O$ and NaH of undetermined purity were loaded into an approximately 2 cm diameter nickel capsule of about 15 cm length and sealed within a somewhat larger stainless steel outer capsule. The oxide was loaded first and then the hydride on top of it so as to maximize the transport required for the two to react completely. The outer capsule was connected to an absolute pressure gauge and a vacuum pump for near complete evacuation. The capsule was held at about 400°C. for about 47 hours, about 430°C. for about 22 hours, about 480°C. for about 42 hours and about 540°C. for about 42 hours to produce the uncorrected hydrogen pressure readings that are plotted in curve C of FIG. 2. The values in curve C are somewhat lower than those calculated from the literature equation in curve A due to permeation of hydrogen through the outer capsule wall. Neutron radiographs showed that the bottom 2.5 cm of the hydride column reacted with the oxide in about 22 hours at 430°C., but further reaction was slow. Thus, sodium hydride remained in the capsule throughout the experiment and the hydrogen pressures plotted in FIG. 2, curve C, are approximately what would be expected with excess sodium hydride. After collecting the data in curve C of FIG. 2 an additional 10 days of heating at about 540°C. consumed all of the hydride within the capsule and the hydrogen pressure dropped to about 250 Torr in the outer capsule. The sodium hydroxide and sodium separated into two molten layers with the sodium at the top as expected. The nickel capsule was not attacked by the sodium hydroxide.

EXAMPLE II

A similarly arranged experimental capsule was loaded with about 28 grams of chips drilled from the bottom of an actual discarded cold trap. After 91 hours of heating at about 480°C., an approximately 1 cm layer of sodium hydroxide appeared at the bottom of the capsule. A neutron radiograph revealed that nearly all of the hydrogen appeared to be within the sodium hydroxide layer. Partial pressure of hydrogen was measured to be 220 Torr at about 480°C. indicating that no free hydride was present. In order to consume the excess oxide that might be present, hydrogen was added into the outer capsule at about 480°C. by repeatedly raising the pressure to 1500 Torr and allowing the hydrogen to diffuse inwardly through the nickel wall. After six days approximately 27 mg of hydrogen was added in that fashion and the residual hydrogen pressure had risen to 800 Torr indicating that the excess oxygen had reacted. A neutron radiograph indicated that the sodium hydroxide level had increased from about 4 grams to 5 grams during the addition of hydrogen gas.

EXAMPLE III

A capsule similar to that used in Examples I and II was equipped with a 2½ cm. long column of nickel turnings supported on a nickel wire grill partway up the capsule length in order to simulate cold trap packing. The capsule was loaded with a mixture of sodium oxide and sodium hydride powder with an O/H atom ratio of 2. In 24 hours at about 480°C., an about 2.5 cm layer of sodium hydroxide formed below the packing. The hydrogen pressure reached a maximum of only 250 Torr in the outer capsule after 6 hours and dropped to 220 Torr after 89 hours.

Therefore, from the above examples it can be seen that oxide and hydride deposits within a sodium cold trap will react to form molten sodium hydroxide at temperatures of 412° to 550°C. The hydroxide forms a dense layer at the bottom of the vessel and will sink or drain through typical cold trap packing. By measuring hydrogen pressures excess hydride or excess oxide can be determined. For example, at about 450°C. a final pressure of approximately 600 Torr would be desirable. Pressures below 250 Torr would indicate excess oxide or pressures above 800 Torr would indicate significant excess hydride. The reaction of sodium hydrides and sodium oxides appear to be nearly complete in 24 hours at 450°C if the materials are well mixed. If they are physically separated a longer time will be needed to drain the impurities as molten sodium hydroxide.

It is therefore seen that the present invention provides a novel method for the unloading of sodium cold trap which previously would have been discarded and replaced at a great waste of materials and man-hours. The method permits the determination and accommodation of either excess hydride impurities or excess oxide impurities as would be expected within a typical liquid-metal-cooled system.

The embodiments of the invention in which an exclusive property or privilege is claimed are defined as follows:

1. A method of removing impurities including sodium hydride and sodium oxide from a liquid-metal system including a cold trap wherein said impurities deposit comprising:
    heating said trap to form molten sodium hydroxide from the reaction of sodium hydride and sodium oxide;
    monitoring the hydrogen partial pressure within said cold trap to determine excess sodium hydride; and
    removing impurities from said system by draining said molten sodium hydroxide and by adjusting the partial pressure of hydrogen gas to a hydrogen pressure between the hydrogen dissociation pressure of sodium hydride and the hydrogen dissociation pressure of sodium hydroxide at the temperature of the materials within the cold trap.

2. The method of claim 1 wherein liquid metal is removed from said cold trap prior to heating to form molten sodium hydroxide.

3. The method of claim 1 wherein said cold trap is heated to a temperature of between 412° to 550°C.

4. The method of claim 1 wherein said hydrogen gas is vented until a hydrogen partial pressure of less than 800 Torr is achieved at a temperature not less than 450°C.

5. The method of claim 1 wherein said hydrogen partial pressure is monitored at less than 250 Torr at not less than 450°C. and hydrogen is added into said cold trap to react with excess oxides and form a drainable product.

6. The method of claim 5 wherein sufficient hydrogen is added to said cold trap to increase said hydrogen partial pressure to more than 400 Torr at 450°C. after draining said molten sodium hydroxide.

7. An improved cold trap apparatus for removing impurities from a liquid-metal system comprising:
a first tank having an inlet and an outlet interconnected with said liquid-metal system for flow of liquid metal therethrough;
means for varying the temperature of said first tank from a temperature at which said impurities are solid to a temperature at which said impurities form a melt;
a second tank interconnected with said first tank for receiving said melt formed of impurities; and
monitoring means for determining whether impurities remain in said trap.

8. The cold trap of claim 7 wherein said liquid metal within said liquid-metal system includes sodium and said impurities include sodium oxide and sodium hydride, and wherein there is also included means for adding and withdrawing hydrogen from said cold trap in order to substantially achieve stoichiometric balance between said sodium oxide and sodium hydride in the formation of sodium hydroxide.

9. The cold trap of claim 7 wherein there are included means for removing liquid metal therefrom while said impurities are in solid form.

10. The cold trap of claim 7 wherein said temperature varying means are capable of varying said cold trap temperature between 100°C and 550°C.

11. The cold trap of claim 7 wherein said monitoring means comprising a pressure measuring device coupled to the inner volume of a rigid vessel constructed of a material which is selectively permeable to hydrogen gas, said vessel being exposed at its outer surfaces to the inner volume of said first tank to provide means of measuring the partial pressure of hydrogen gas within said first tank.

12. The cold trap of claim 7 wherein said monitoring means include means for indicating liquid level within said second tank in combination with means for measuring the partial pressure of hydrogen gas within said first tank.

* * * * *